US010586412B2

(12) United States Patent
Parthasarathy et al.

(10) Patent No.: US 10,586,412 B2
(45) Date of Patent: Mar. 10, 2020

(54) CIRCUIT AND METHOD FOR USING CAPACITIVE TOUCH TO FURTHER SECURE INFORMATION IN RFID DOCUMENTS

(71) Applicant: Texas Instruments Incorporated, Dallas, TX (US)

(72) Inventors: Prasanna Parthasarathy, Frisco, TX (US); Michael L Mitchell, Ennis, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 114 days.

(21) Appl. No.: 14/491,101

(22) Filed: Sep. 19, 2014

(65) Prior Publication Data
US 2016/0086404 A1  Mar. 24, 2016

(51) Int. Cl.
*G07C 9/00* (2006.01)
*G06F 21/62* (2013.01)

(52) U.S. Cl.
CPC ...... *G07C 9/00119* (2013.01); *G06F 21/6245* (2013.01); *G07C 9/00079* (2013.01); *G06F 2221/2121* (2013.01); *G06F 2221/2137* (2013.01)

(58) Field of Classification Search
CPC .... G06F 21/6245; G06F 12/14; G06F 21/602; G06F 2221/2121; G06F 2221/2137; G06K 19/025; G03G 2215/00299; B42D 25/25
See application file for complete search history.

(56) References Cited

U.S. PATENT DOCUMENTS

| | | | | |
|---|---|---|---|---|
| 2006/0266831 A1* | 11/2006 | Kozlay | ............ | G06K 19/07345 235/451 |
| 2006/0267737 A1* | 11/2006 | Colby | ................ | G06K 19/0707 340/10.51 |
| 2007/0109101 A1* | 5/2007 | Colby | ................ | G06K 19/0723 340/10.4 |
| 2007/0152829 A1* | 7/2007 | Lindsay | ............. | G06K 19/0717 340/572.3 |
| 2010/0123581 A1* | 5/2010 | Hatfield | ............. | G06K 19/0716 340/572.3 |
| 2012/0280044 A1* | 11/2012 | Mullis | .................. | H01Q 1/2225 235/492 |

* cited by examiner

*Primary Examiner* — Thomas D Alunkal
(74) *Attorney, Agent, or Firm* — Brian D. Graham; Charles A. Brill; Frank D. Cimino

(57) ABSTRACT

A system for limiting access to confidential information including storage circuitry for storing the confidential information. An access enabling circuit allows access to the storage circuitry in response to a first level of an enabling signal. A processor generates the enabling signal for a predetermined amount of time in response to sensing of a change of a predetermined value that is produced in response to an act by a person responsible for the confidentiality of the confidential information. The enabling signal assumes a second level after the predetermined amount of time to block access to the storage circuitry.

19 Claims, 8 Drawing Sheets

CIRCUIT AND METHOD FOR USING CAPACITIVE TOUCH TO FURTHER SECURE INFORMATION IN RFID DOCUMENTS

BACKGROUND OF THE INVENTION

The invention relates to preventing unauthorized access to RFID (Radio Frequency Identification) documents such as passports, and more particularly to circuitry incorporated in passports and other confidential documents to prevent unauthorized RFID access to them unless certain conditions are met.

The term RFID refers to the wireless use of radio-frequency electromagnetic fields to transfer data to automatically identify or track RFID "tags" or electronic labels on various objects. The RFID tags contain electronically stored information and may be powered up and read or interrogated at short distances by electromagnetic fields. Unlike a barcode, an RFID tag does not need to be within line of sight of an RFID reader, and may be embedded within an object to be accessed and interrogated. RFID typically uses an electronic chip which is affixed to the object to be accessed and typically contains identification information and other information which may be read, recorded, or rewritten. An RFID reader can provide the surge of power needed to "wake up" the access control circuitry in the electronic chip, read the passport data, and then go back to a "sleep state" or an "off state". An RFID system uses RFID tags attached to or embedded within objects to be accessed/identified. RFID readers include transmitter-receivers, i.e., transceivers, for transmitting a signal to the tag and receiving and reading a response of the RFID chip. To start operation of a "passive" RFID chip, it must be powered by the signal transmitted by an RFID reader, wherein that transmitted signal has a power level roughly three times stronger than would be required only for RFID tag identification.

Unfortunately, unauthorized access to typical RFID-based documents can be accomplished by means of any nearby RFID reader that is sufficiently close that its transmitted signal can "wake up" the RFID chip or tag of the document and thereby access data stored in it. Due to the nature of RFID reading, any accessing of the RFID chip requiring less than a half second can be transparent to the document user. A typical RFID tag requires 30-50 μW (microwatts) to operate.

An RFID chip typically includes an antenna, a circuit for producing DC power from the RF signals transmitted by the RFID reader in order to power up the RFID chip, a transceiver for modulating and demodulating the RF signal, and integrated circuitry for storing and processing digital information. The tag information is stored in a non-volatile memory. The RFID tag may also include identification data storage circuitry. In operation, the RFID reader transmits an encoded RF signal to the RFID chip to interrogate it. The RFID chip receives and decodes the RF signal and then responds by transmitting stored identification information and possibly other information back to the RFID reader.

RFID tags included in recent US passports typically store the same information that is printed within the passport and also store a digital picture of the passport owner. Unfortunately, the stored information is vulnerable to unauthorized "skimming" or eavesdropping of the RFID tag. In order to make it more difficult for nearby unauthorized RFID readers to "skim" information in a RFID passport tag while the passport is closed, a thin metal lining or shield has been included in or around the passports. However, this approach has been unsatisfactory in some cases because of its costs and also because of various user compliance problems. For example, some people either lose the passports or forget to replace the shields on the passports after removing them to allow them to be accessed by a RFID reader. In some cases the shields are so thin that they tear easily, and sometimes people simply fail to use them. Another method of preventing unauthorized reading of RFID tags in secure documents is by use of cryptography, which typically is complex and costly. Complex biometric passports (also known as digital passports) use contactless smart card technology including a microprocessor and antenna embedded in the cover or a center page of the passport, but these are costly and also unsatisfactory in some cases. If cryptography is utilized in every RFID-based passport or document, the cryptography needs to be complex and the associated calculations require a large amount of relatively expensive computing power.

Thus, there is an unmet need for a convenient and inexpensive way to prevent unauthorized access to a RFID-based document or a passport by anyone who has a RFID reader that is sufficiently close to the document or passport to effectively scan its RFID code.

There also is an unmet need for a convenient and inexpensive way to provide restricted access to a passport with RFID by anyone who has a RFID reader that is sufficiently close to the passport to scan its RFID code.

SUMMARY OF THE INVENTION

It is an object of the invention to provide a convenient and inexpensive way to prevent unauthorized access to a passport with RFID by anyone who has a RFID reader that is sufficiently close to the passport to scan its RFID code.

It is another object of the invention to provide a convenient and inexpensive way to provide restricted access to a passport with RFID by anyone who has a REID reader that is sufficiently close to the passport to scan its RFID code.

Briefly described, and in accordance with one embodiment thereof, the invention provides a system (9,22) for limiting access to confidential information including storage circuitry (14,22) for storing the confidential information. An access enabling circuit (9) allows access to the storage circuitry (14,22) in response to a first level ("1") of an enabling signal (ENABLE). A processor (22) generates the enabling signal (ENABLE) for a predetermined amount of time in response to sensing of a change of a predetermined value that is produced in response to an act by a person responsible for the confidentiality of the confidential information. The enabling signal (ENABLE) assumes a second level ("0") after the predetermined amount of time to block access to the storage circuitry (14,22).

In one embodiment, the invention provides a system (9,22) for limiting access to confidential information, including storage circuitry (14,22) for storing the confidential information; an access enabling circuit (9) for allowing access to the storage circuitry (14,22) in response to a first level ("1") of an enabling signal (ENABLE); and a processor (22) for generating the enabling signal (ENABLE) for a predetermined amount of time in response to sensing of a change of a predetermined value that is produced in response to an act by a person responsible for the confidentiality of the confidential information, the enabling signal (ENABLE) assuming a second level ("0") after the predetermined amount of time to block access to the storage circuitry (14,22). In one embodiment, the change of the predetermined value is produced in response to a physical act by the person responsible for the confidentiality of the confidential information.

In one embodiment, the access enabling circuit (9) includes an RFID (Radio Frequency Identification) circuit (9) including a transceiver (10) and also includes an RFID tag (14) which is included in the storage circuitry (14,22). The RFID circuit (9) includes an enabling input for receiving the enabling signal. In one embodiment, the RFID circuit (9) is awakened and powered by energy received from a RFID reader (3).

In one embodiment, the predetermined value is a capacitive value, the system including capacitance sensing (CapSense) circuitry (24) for sensing the capacitance value and determining an amount of change in the capacitive value, wherein the processor and the capacitance sensing circuitry (24) are part of a microcontroller (22).

In one embodiment, the confidential information, the RFID circuit (9), and the microcontroller (22) are embedded in an RFID-based passport (5).

In one embodiment, the RFID circuit (9) receives a wireless interrogation signal from an RFID reader (3) by means of an antenna (11), the antenna (11) being coupled to a rectifier circuit (17) which produces power to awaken and operate the microcontroller (22).

In one embodiment, the system includes a battery (20) which provides power to operate the microcontroller (22).

In one embodiment, at least part of the confidential information is contained in a secure package/container, wherein another part of the confidential information, the RFID circuit (9), and the microcontroller (22) are in the secure package/container (15-1)

In one embodiment, the capacitive value is a capacitance associated with a conductive trace (16-1) which is embedded in a RFID passport (5) including the confidential information.

In one embodiment, the microcontroller (22) operates to count a number of times the confidential information has been accessed to indicate whether the number of times indicates a security breach.

In one embodiment, the confidential information is contained in an electronic document (14,22). The electronic document is stored in a wireless digital device (5) which communicates in accordance with a predetermined communication framework.

In one embodiment, the invention provides a method for limiting wireless digital access to confidential information in a wireless digital device (5), the method including storing the confidential information in storage circuitry (14,22) in the wireless digital device (5); operating a processor (22) to generate an enabling signal (ENABLE) for a predetermined amount of time in response to sensing of a change of a predetermined value of a quantity that is produced in response to an act by a person responsible for the confidentiality of the confidential information, the enabling signal (ENABLE) having one level ("0") after the predetermined amount of time to block access to the storage circuitry (14,22); and allowing wireless digital access to the storage circuitry (14,22) in response to another level ("1") of the enable signal (ENABLE).

In one embodiment, the wireless device is provided as a RFID (radio frequency identification) device (5).

In one embodiment, the predetermined value is a capacitive value, the method including utilizing capacitance sensing circuitry (24) for sensing the capacitance value and determining an amount of change in the capacitive value, wherein the processor and the capacitance sensing circuitry (24) are part of a microcontroller (22).

In one embodiment, the method includes embedding the confidential information, the RFID circuit (9), and the microcontroller (22) in an RFID-based passport (5).

In one embodiment, the method includes storing the confidential information as an electronic document (14,22), and storing the electronic document in a wireless digital device (5) which communicates in accordance with a predetermined communication framework.

In one embodiment, the invention includes a system for limiting wireless digital access to confidential information in a wireless digital device (5), including means (14,22) for storing the confidential information in the wireless digital device (5); processing means (22) for generating an enabling signal (ENABLE) for a predetermined amount of time in response to sensing of a change of a predetermined value of a quantity that is produced in response to an act by a person responsible for the confidentiality of the confidential information, the enabling signal (ENABLE) having one level ("0") after the predetermined amount of time to block access to the storage circuitry (14,22); and means (9) for allowing wireless digital access to the storage circuitry (14,22) in response to another level ("1") of the enable signal (ENABLE).

DETAILED DESCRIPTION OF THE PREFERRED EMBODIMENTS

Various embodiments of the invention protect information in a RFID-accessible document, e.g., a passport, by preventing it from being accessed or read by an RFID reader unless the document has first been touched, opened, or otherwise handled by the person in possession of the document in some way that "enables" it or "resets" it to allow information in the document to be accessed. The present invention thus prevents unauthorized access to the document, even if the RFID reader transmits sufficient power, by requiring the RFID circuitry embedded in the document to be "enabled" by the person in possession of the RFID document before it can be "powered up" in response to the signal transmitted by the RFID reader. For example, the RFID circuitry may be enabled if the person in possession of the passport or document touches a sense capacitor that is embedded in the document or physically opens the document or actuates a switch in or associated with the document. For example, there also may be a physical requirement for the person in possession of a passport to keep the passport open during scanning by the RFID reader to thereby indicate a need and intent by the passport holder to allow access to the contents of the RFID tag of the RFID circuitry. Such measures may effectively prevent unauthorized access to the contents of the RFID passport.

Alternatively, a circuit somewhat analogous to RFID chip 9 but operative in accordance with a different suitable communications framework could be embedded in a cover of a package or case containing a device such as a smart phone or a computer such as a digital tablet so as to allow other kinds of wireless access such as Wi-Fi access, 4G access, or GPS communication with the device.

Figure 1:
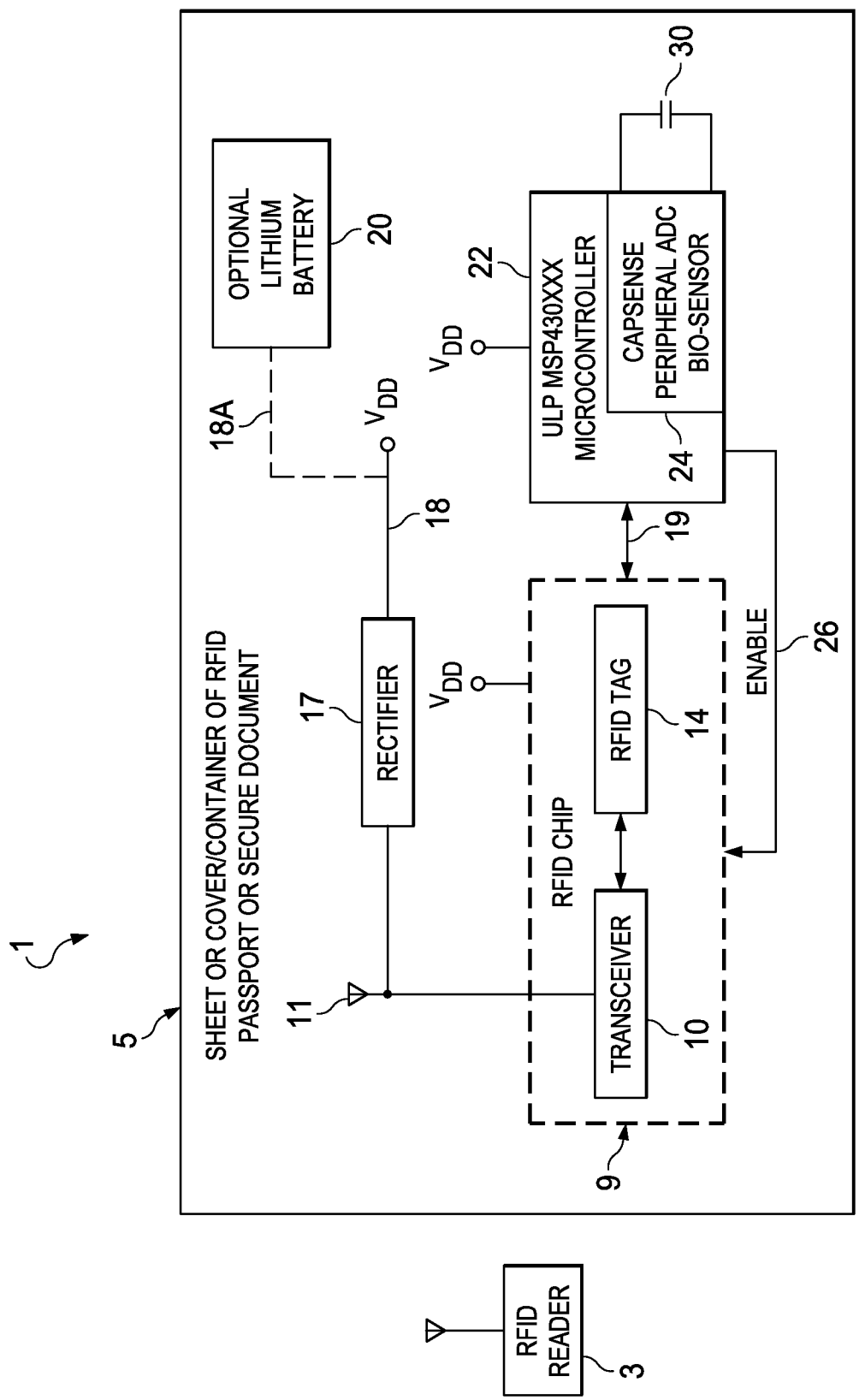
FIG. 1 is a block diagram of a system including a capacitive touch enabling system for preventing unauthorized scanning of an RFID passport.

In FIG. 1, a secure document identification system 1 includes a conventional RFID reader 3 which attempts to access information in an RFID passport 5 (or other secure document). Passport 5 includes a conventional RFID chip 9 embedded in a cover or disposed on a sheet of passport 5. RFID chip 9 includes a transceiver 10, an RFID tag or label 14, and an antenna 11. RFID reader 3 may be either authorized or unauthorized to access information from RFID tag 14 or any other part of passport 5. An ultra-low-power microcontroller, which may be a commercially available Texas Instruments Wolverine ultra-low-power microcontroller, part number MSP430FR59xx (where the "xx" indicates the class of the microcontroller), is embedded in the cover or a sheet of passport 5. Microcontroller 22 includes a peripheral capacitance bio-sensor or capsense circuit 24 which is capable of sensing changes in an external capacitance 30 embedded in or associated with the cover or pages of passport 5 caused by a person touching or opening passport 5.

Microcontroller 22 generates an enable signal "ENABLE" on conductor 26, which is connected to an enable input of RFID chip 9 if a detected change in the above mentioned external capacitance exceeds a predetermined level and therefore indicates that the person possessing passport 5 wishes to allow the nearby RFID reader 3 to wirelessly enable RFID chip 9 and also allow information stored in chip 9 and in other parts of passport 5 to be accessed by RFID reader 3. Microcontroller 22 may be powered by a voltage $V_{DD}$ produced by a rectifier circuit 17, the input of which is connected to transceiver antenna 11 in response to a sufficiently strong RF signal from the nearby RFID reader 3 and received by antenna 11. Alternatively, microcontroller 22 may be powered by a lithium battery 20. As indicated by dotted line 18A, the output $V_{DD}$ of rectifier 17 could also be utilized to charge lithium battery 20.

If RFID chip 9 is enabled, i.e., turned ON by a "high" level of the signal ENABLE, it can receive instructions and commands from RFID reader 3 and, in response to the instructions and/or commands, it can transmit data stored in RFID tag 14 and/or microcontroller 22 back to RFID reader 3. RFID chip 9 can communicate with microcontroller 22 via a digital signal path 19. When the ENABLE signal is "low" the entire RFID chip 9 is turned OFF and does not consume an unacceptably large amount of power.

Figure 2:
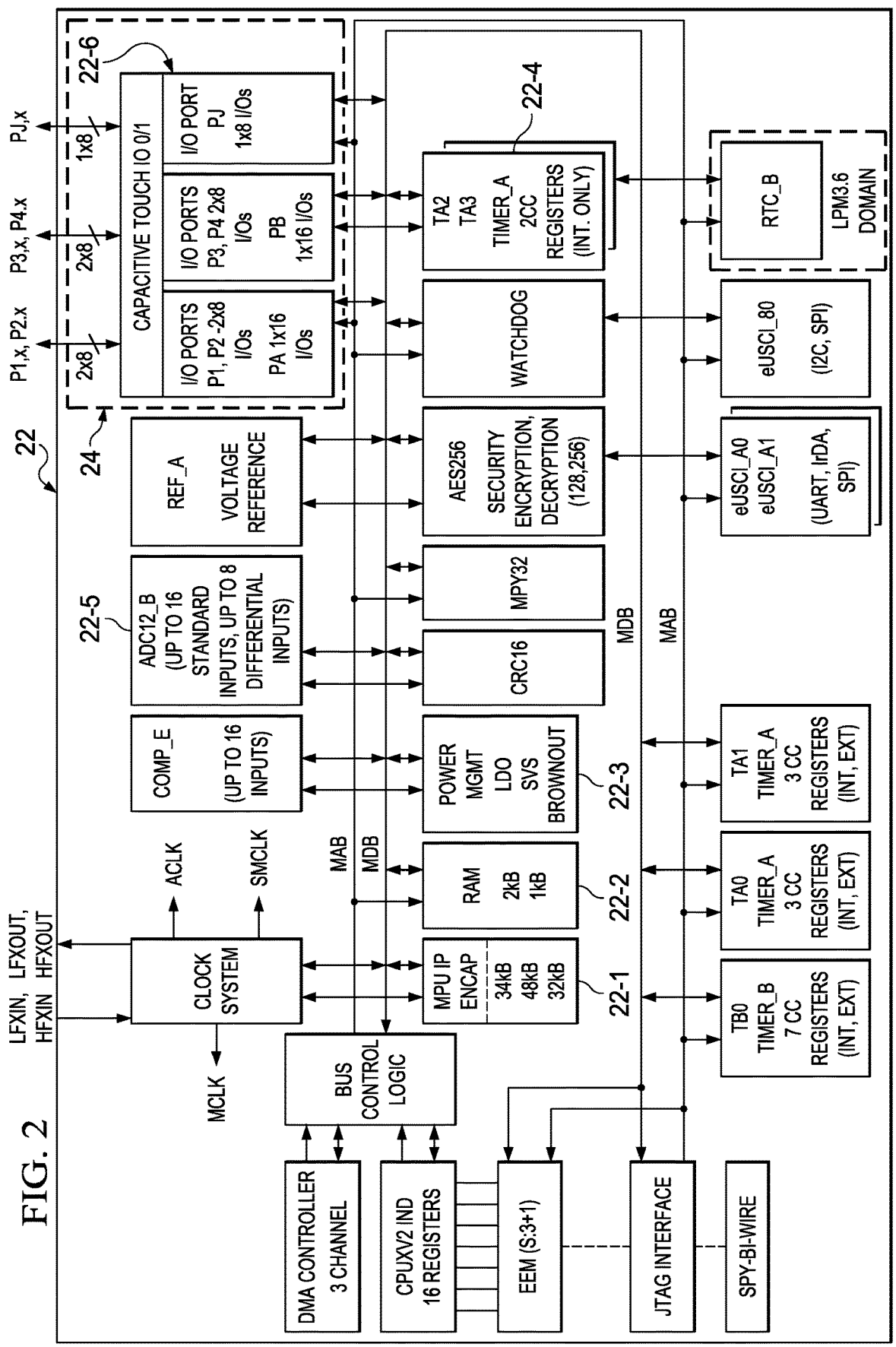
FIG. 2 a functional block diagram of the microcontroller in block 22 of FIG. 1.

At this point, it will be convenient to briefly describe the structure and operation of the Texas instruments Wolverine MSP430FR59xx ultra-low-power microcontroller 22. Referring to FIG. 2, which shows a functional block diagram of the MSP430FR59xx, microcontroller 22 includes a microprocessor unit 22-1, a random access memory 22-2, power management circuitry 22-3, timer registers 22-4, a multi-channel ADC (analog to digital converter) 22-5, and a number of capacitive touch input/output ports 22-26 (included in block 24 in FIG. 1) connected to corresponding external capacitive touch port conductors. (This is all in addition to the usual DMA controller, CPU, electrically erasable memory, bus control logic, clock generation circuitry, encryption/decryption circuitry etc., of a typical state-of-the-art integrated circuit microcontroller.) The fact that microcontroller 22 is a ultra-low-power microcontroller means that it can remain in a "hibernate" or extremely low power state or in an OFF state for a very long time interval and then "wake up", perform various functions, and then go back into its sleep or hibernation state, and thereby use a very small amount of power over that long time interval.

The very low power consumption of the MSP430FR59xx microcontroller 22 makes it suitable for long-term microcontroller implementations which are required to be intermittently operable over a very long amount of time while being powered only by a small battery or other low power source. In addition to its very low-power characteristics, the MSP430FR59xx microcontroller 22 also includes capacitive touch input/output (I/O) ports that may, for example, be connected to short copper traces or micro-wire traces that are connected to the capacitive I/O ports of MSP430FR59xx ultra-low-power microcontroller 22. The MSP430FR59xx microcontroller 22 is able to detect capacitances and compute capacitance changes that occur in devices or circuitry connected to any of its I/O ports. For example, microcontroller 22 can sense the capacitance change that occurs when a human finger touches a copper trace embedded in an RFID passport. As another example, microcontroller 22 can sense the change in capacitance between separate copper traces that occur as a result of opening and/or closing a RFID passport and/or can recognize a sensed capacitance or capacitance change corresponding to an open state or a closed state of the RFID passport 5. The MSP430FR59xx microcontroller 22 can accomplish this by "remembering" the previous capacitance value, comparing it with a corresponding present capacitance value, and computing the difference between them.

The MSP430FR59xx microcontroller 22 can be "calibrated" based on various different "prototypes". Example, if thin copper traces are embedded or formed on adjacent sheets of a RFID passport (or other secure RFID document) and the capacitance between the embedded copper traces is measured when the sheets are touching each other and also is measured when the sheets are not touching (while the passport is opened); that information can be used to calibrate microcontroller 22 and the passport in which the microcontroller 22 is embedded. The "calibrating" of microcontroller 22 includes calculating capacitances of the documents or materials used in the documents.

A typical wakeup time for microcontroller 22 from a deep sleep state is from roughly 5 to 8 μs to as high as roughly 150 μs (microseconds). Note that the parameters of microcontroller 22 which are very important include first, the amount of power consumed during both the microcontroller's sleep mode and its active mode because they strongly affect battery life if a battery is used, and second, the amount of time required for microcontroller 22 to "wake up", because this amount of time affects the response time of RFID passport 5 to an interrogation signal received from RFID reader 3. (Note that the MSP430FR59xx microcontroller 22 has multiple selectable low-power states, all of which require different amounts of time for microcontroller 22 to wake up, so determining battery power usage versus microcontroller wakeup time is a trade-off that can be dealt with by selecting which low-power state to utilize. Microcontroller 22 can cycle between the various low-power states as it performs different functions.)

In its active mode, microcontroller 22 requires approximately 100 µA (microamperes) of current per megahertz of operating speed. For 10 MHZ operation, microcontroller 22 requires 1 mA (milliamperes) of operating current for approximately 10 seconds. In its standby mode, in which microcontroller 22 typically spends nearly all of its time, its current consumption is only approximately 0.5 µA. For example, if RFID passport 5 is opened once per day, it is in its active mode for about 10 seconds every 24 hours, so its average current consumption is approximately 0.0227 mA per hour. In this example, a 1000 mA-hour battery source would have a lifetime of roughly 5 years, and a 2500 mA-hour battery would have a lifetime of roughly 12 years.

The boot-up time from its off state for microcontroller 22 in this example is roughly one second, and its boot-up time is even less when it is waking up from a low power state. Therefore, the entire operation of waking up microcontroller 22 reading its capacitance sensing circuit 22-6, checking the state of the document, and then enabling RFID chip 9 therein may be completed in less than roughly 5 milliseconds.

The lifetime of a passport typically is 5 to 10 years or more. Therefore, if embedded microcontroller 22 is powered by a battery 20 it needs to consume only an extremely small amount of power when in its standby mode. The battery (or other power source) should not add significant bulk or cost to RFID passport 5. In some cases, paper batteries or the like can be used to provide the power needed for an RFID document including embedded access-control circuitry of the kind described herein. (Each sheet of battery paper can generate approximately 2.4 volts with a power density of approximately 0.6 mA per square centimeter. For higher voltage requirements, battery paper sheets can be stacked. Battery paper operates from −100° Fahrenheit and is capable of delivering quick surges of current.)

It should be understood that the term "document" as used herein is intended to encompass various items, including passports, paper documents, and company badges, which may have a lifetime of only one or two years. For example, a contractor working for a company may receive a secure RFID badge which needs to be replaced every year. In such a document or badge, a paper cell battery or the like might be adequate to power controller 22.

Figure 3A:
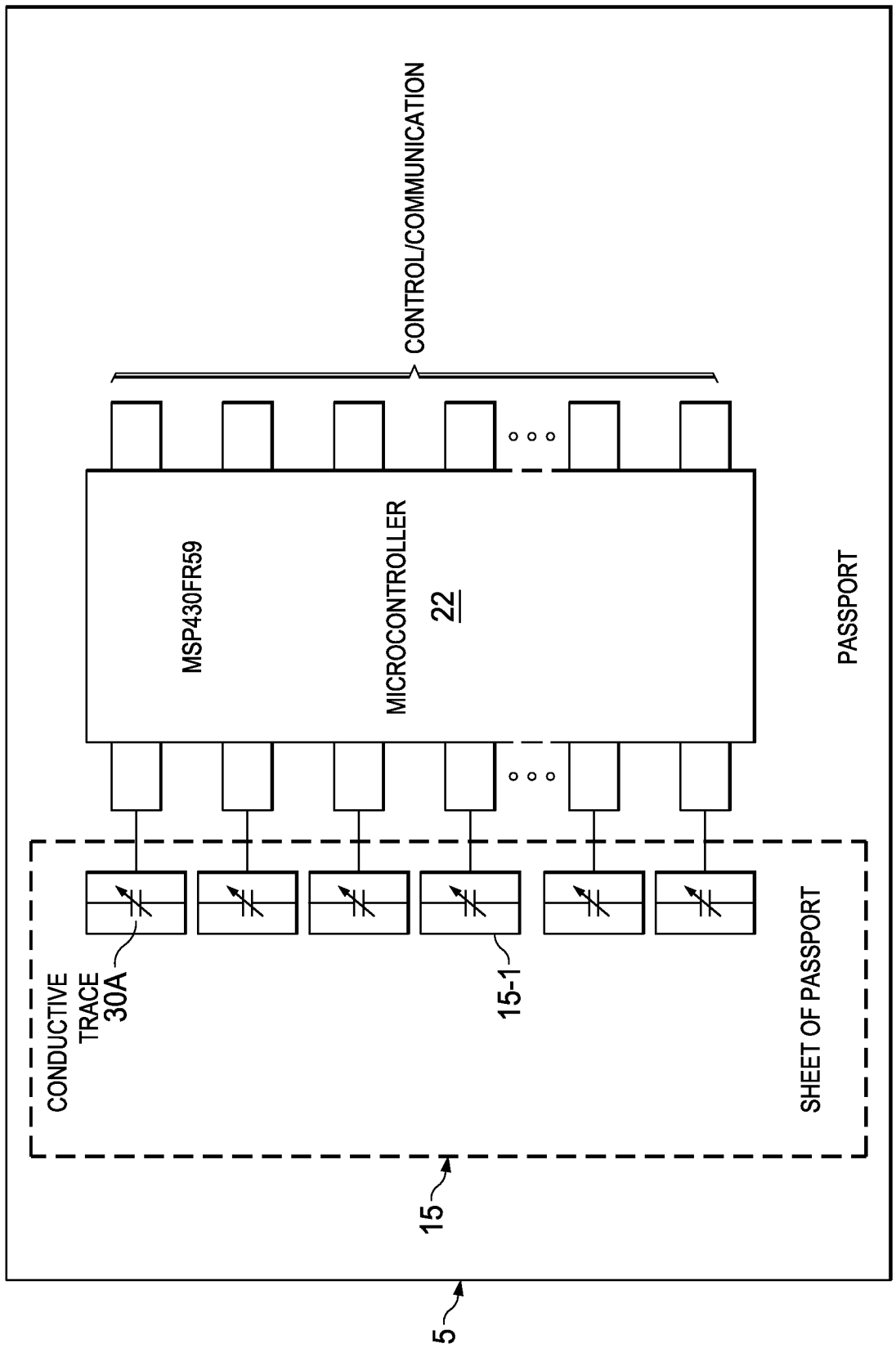
FIGS. 3A-D are diagrams that show conductive traces of a touch capacitor which is embedded in a passport, a secure document, or its container.

FIGS. 3A-D are diagrams that show one or more elements of one or more touch capacitors (or alternatively, other types of switches and sensor elements, such as inductors) which can be "embedded" in a passport, a secure document, or its container. First, FIG. 3A illustrates the connection of multiple capacitive sensor elements 30A embedded in one or more sheets 15 of a RFID-based passport 5. Some of the capacitive sensor elements 30A may be embedded in different sheets. All of the capacitive sensor elements 30A are connected to corresponding ports of capacitive touch input/output circuitry 22-6 of microcontroller 22 (FIG. 2).

Figure 3B:
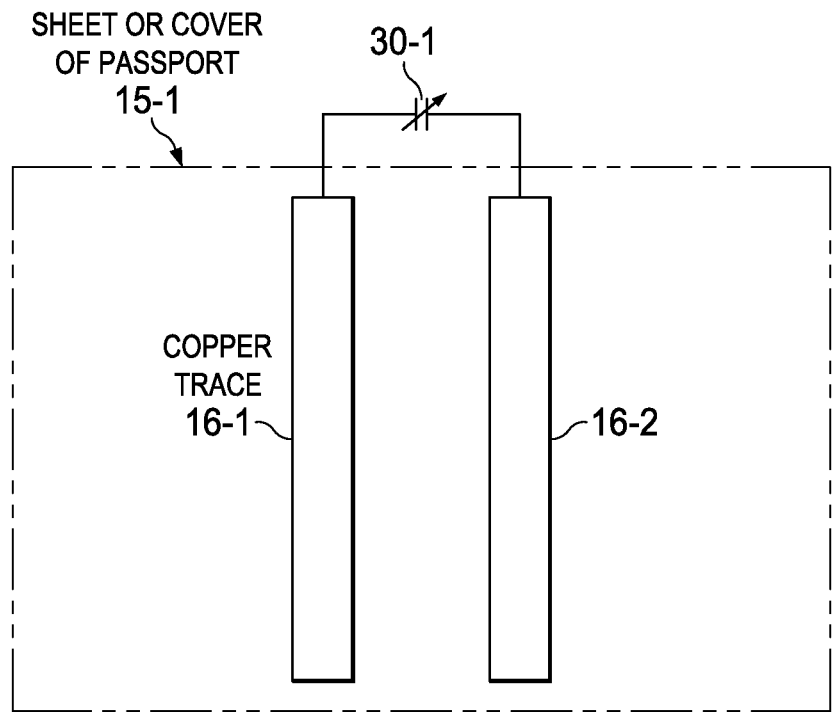

FIG. 3B shows a capacitive sensor element 30-1 as a variable capacitance between conductive traces or micro-wires 16-1 and 16-2 in/on a sheet or cover 15-1 of RFID-based passport 5. Capacitive sensor element 30-1 is illustrated as a variable capacitance, the capacitance of which may be influenced by the presence of a human finger or other at least somewhat conductive element being introduced into the region of the electrical field associated with conductive traces 16-1 and 16-2 (as subsequently explained with reference to FIG. 3D). If the finger simultaneously touches conductive traces 16-1 and 16-2, it short-circuits traces 16-1 and 16-2 together so that in essence they function as an on-off switch.

Figure 3C:
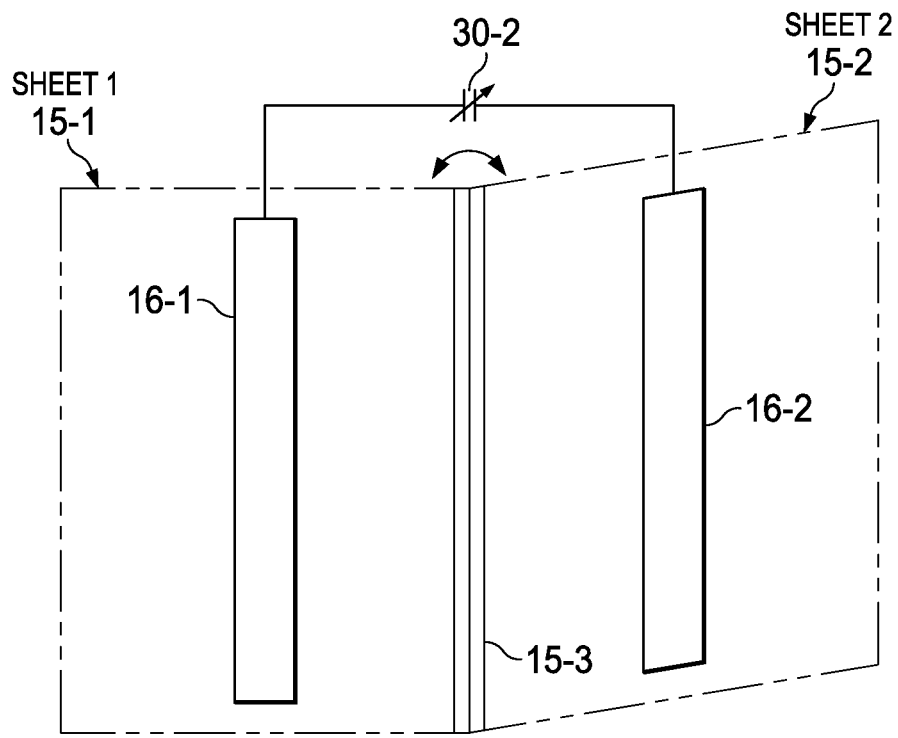

FIG. 3C shows capacitive sensor element 30-1 as the variable capacitance between conductive traces or micro-wires 16-1 and 16-2 in the case in which conductive trace 16-1 is embedded in sheet or passport cover 15-1 of RFID-based passport 5 and conductive trace 16-2 is embedded in a different sheet 15-2 of passport 5. Capacitive sensor element 30-2 is illustrated as a variable capacitance, the capacitance of which may be influenced by the presence of a human finger or other somewhat conductive element being introduced into the region of the electrical field associated with conductive traces 16-1 and 16-2.

Figure 3D:
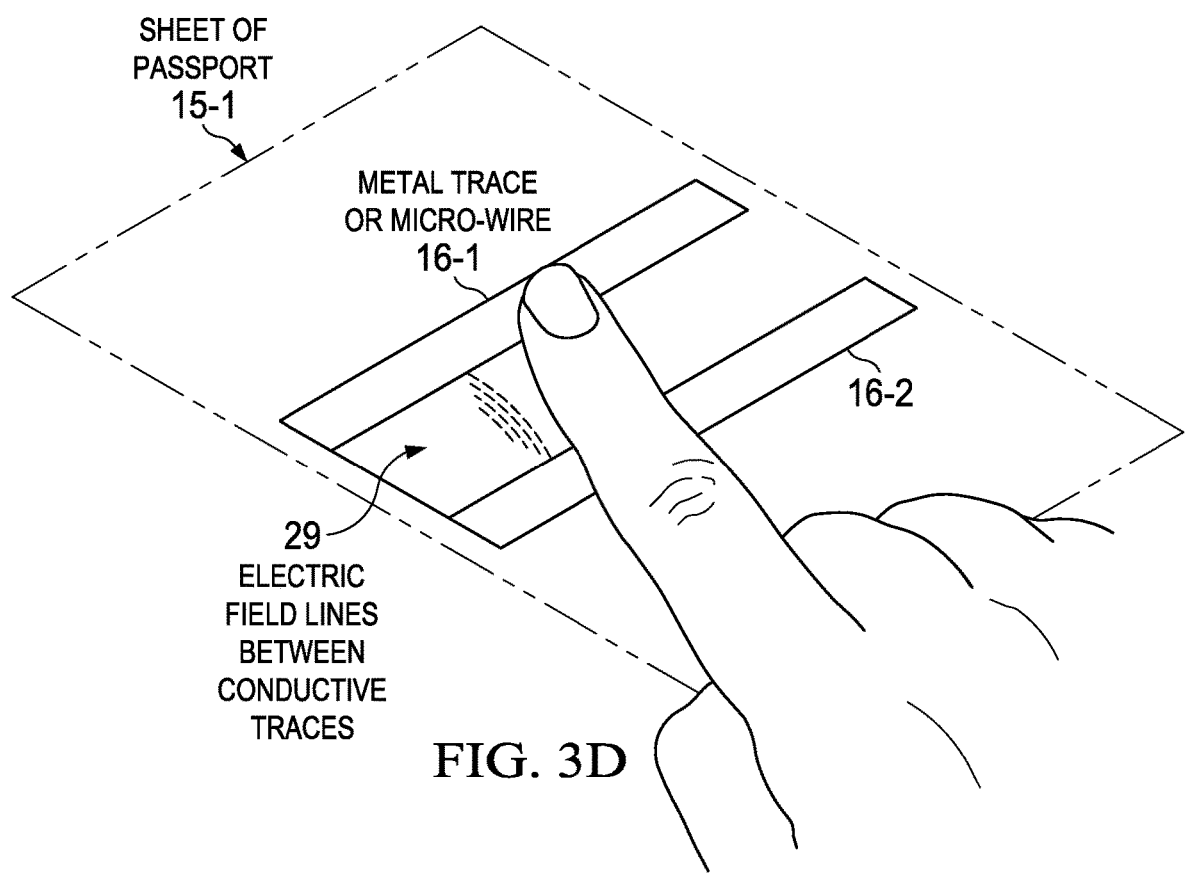

FIG. 3D shows a perspective view of passport sheet 15-1 in which a human finger 28 causes a variation in the capacitance between embedded conductive traces 16-1 and 16-2 by interrupting some of the electric field lines 29 between those conductive traces. If finger 28 actually touches both of conductive traces 16-1 and 16-2, that short-circuits them together as if they were terminals of a mechanical switch.

Conductive metal traces or micro-wires such as conductors 16-1 and 16-2 in FIGS. 3B and 3C are formed on or deposited on embedded in pages 15-1 and/or 15-2 of RFID passport 5. These metal traces or micro-wires may be formed, for example, on one or two pages of passport 5, as shown, and may be coupled to input/output terminals of capacitive touch I/O port 22-6 in FIG. 2. The capacitance between copper traces 16-1 and 16-2 in FIG. 3B varies as a human hand or finger touches them, and the capacitance between traces 16-1 and 16-2 in the example of FIG. 3C varies as RFID passport 5 is opened. Therefore the capacitance change between the present measured value of capacitance associated with one or both of the copper traces and a prior measured value of that same capacitance can be computed and compared to a threshold value that indicates whether the signal ENABLE applied by microcontroller 22 to the enable input RFID chip 9 of RFID passport 5 should be set to a "1" or "high" level to allow access by RFID reader 3 to the data on RFID tag 14.

Alternatively, variable capacitance 30-1 in FIG. 3B or variable capacitance 30-2 in FIG. 3C could be a manual switch that the person in possession or control of the RFID passport or other secure document could manually or even remotely actuate to enable wireless access to the secure passport or document.

Figure 4:
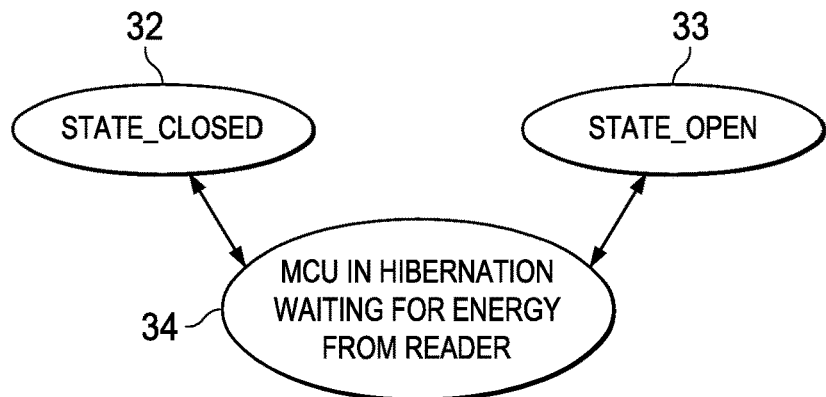
FIG. 4 is a diagram of a state machine that represents operation of the microcontroller in block 22 of FIG. 1.

The state machine shown in FIG. 4 defines the main action blocks or "states" of the secure document identification system shown in FIG. 1. The program executed by microcontroller 22 operates in accordance with 3 separate states. The first state is the "Waiting State" designated by reference numeral 34, in which the program/algorithm waits for microcontroller 22 to "wake up" when it is in its "hibernation" state. The second state is the STATE_OPEN state designated by reference numeral 33. The third stage is the STATE_CLOSED state designated by reference numeral 32. Upon "waking up" when sufficient energy is received from a nearby RFID reader, if the condition for STATE_OPEN is met, the program/algorithm transitions to that state and performs a predetermined set of actions and then returns to the Waiting State 34. However, if the condition for STATE_OPEN is not met, the program/algorithm instead enters the STATE_CLOSED condition designated by reference numeral 32 and can perform a set of actions if required and then returns to the Waiting State 34.

Figure 5:
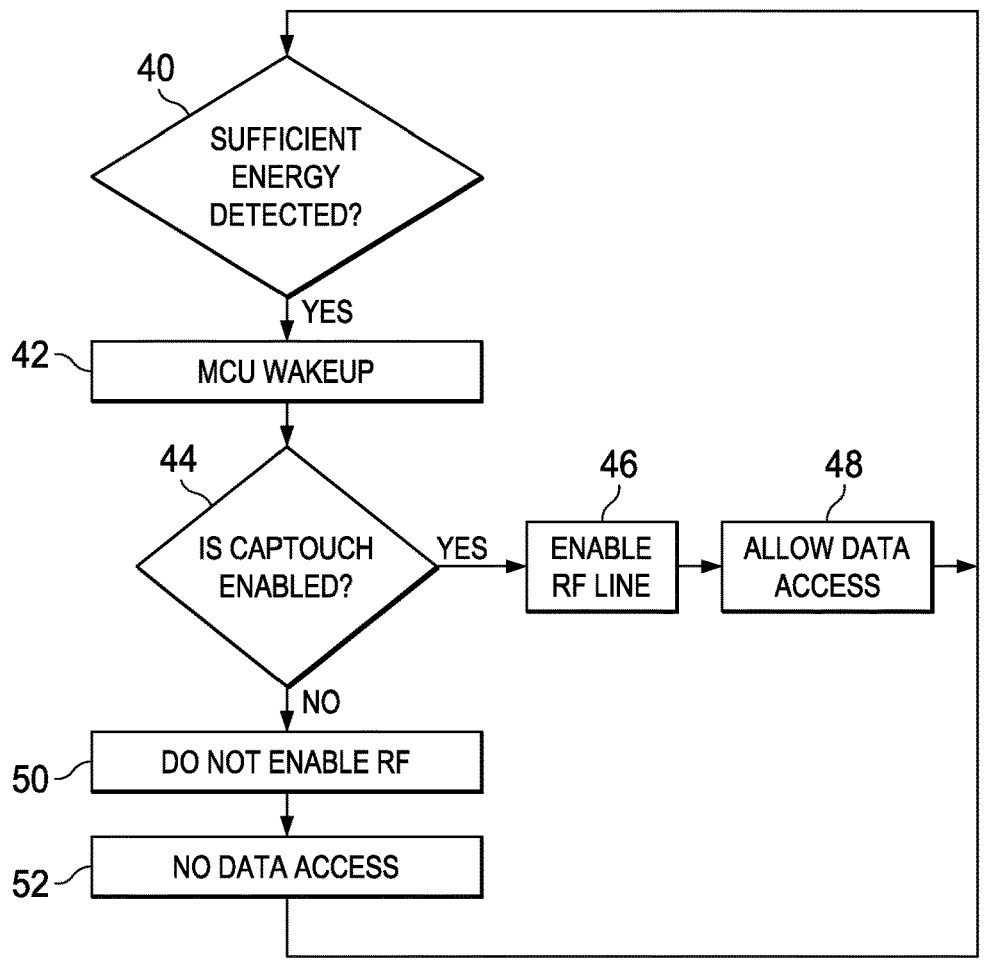
FIG. 5 is a flowchart illustrating a basic algorithm implemented by the microcontroller in block 22 of FIG. 1.

The flowchart of FIG. 5 generally indicates how the microcontroller 22 wakes up, makes decisions and takes affirmative action so as to prevent unauthorized data access by RFID reader 3. In FIG. 5, the program/algorithm executed by microcontroller 22 waits for sufficient energy to be received from a remote RFID reader as indicated in block 40, and then wakes up microcontroller 22, as indicated in block 42. The program/algorithm then proceeds to decision block 44 to determine if the capacitive sensor 30 in FIG. 1 and the capacitor input/output circuitry 24 in FIGS. 1 and 2 have captured a valid input which indicates completion of the required authorization act by the person in possession or control of the RFID passport or other secure document. If the determination of decision block 44 is affirmative, the program operation proceeds to enable the RFID chip 9 in FIG. 1, as indicated in block 46 of FIG. 5. The program/algorithm then allows access to stored data in RFID tag 14 and/or microcontroller 22, as indicated in block 48. Upon completion of the data access operation, the program/algorithm returns to block 40. If the determination of decision block 44 is negative, this means the external capacitance or sensors have not detected a valid input representing completion of the required action by the person in possession or control of the RFID passport. In this case, RFID chip 9 remains disabled, as indicated in block 50, and access to the data in RFID passport 5 is blocked, as indicated in block 52. The program/algorithm then returns to block 40.

In the case in which microcontroller 22 is powered by a battery, microcontroller 22 may be waiting in a low-power state because it already has a lithium battery providing power. Microcontroller 22 may be waiting in a loop for RFID energy to be detected.

Figure 6:
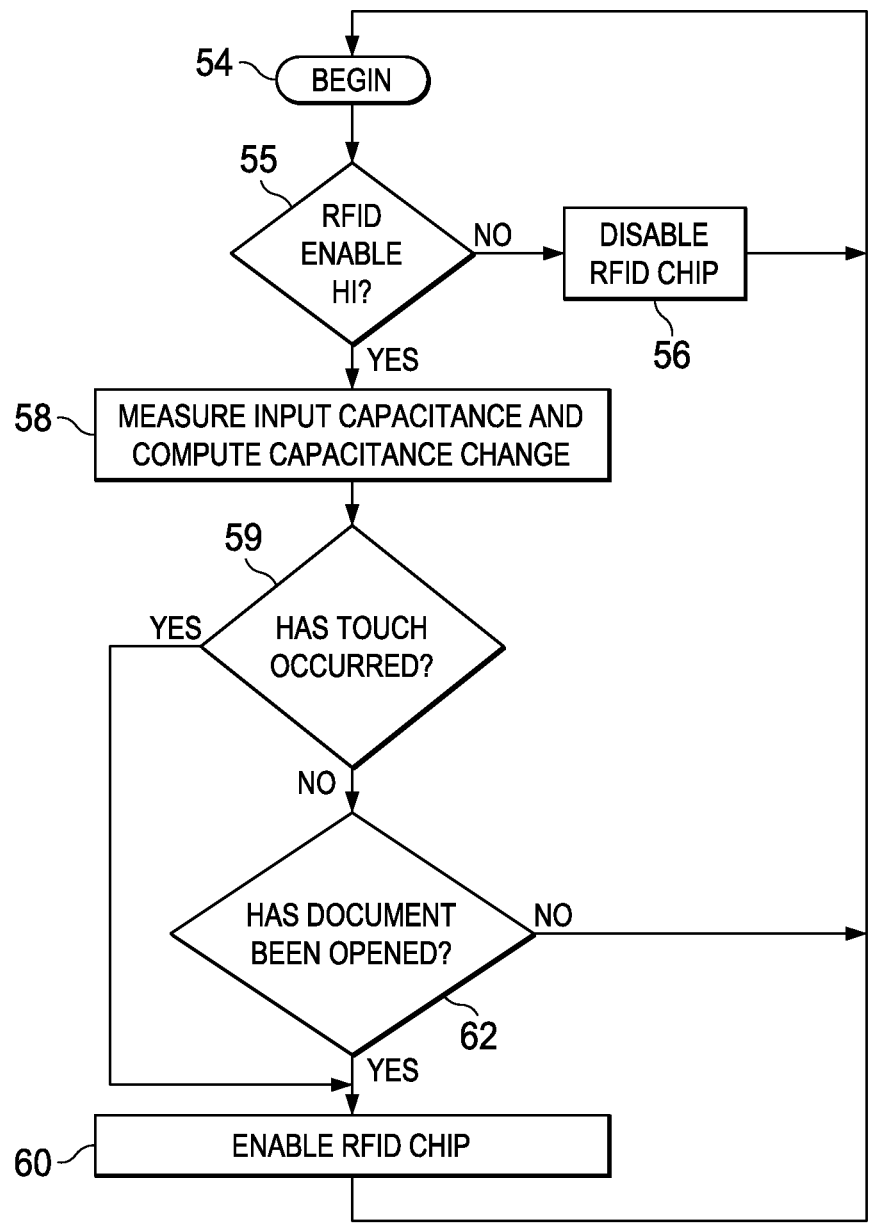
FIG. 6 is a more detailed flowchart of the algorithm shown in FIG. 5.

In the flowchart of FIG. 6, the RFID access control program executed by microcontroller 22 goes from entry label 54 to decision block 55 and determines if the RF enable signal ENABLE is at a high level. If this determination is negative, the RFID access control program goes to block 56 and ensures that ENABLE is at a low level so that RFID chip 9 is disabled and will not respond to an RF signal transmitted by RFID reader 3. The RFID control program then returns to label 54 and repeats.

If the determination of decision block 55 is affirmative, the program being executed by microcontroller 22 goes to block 58 and ensures that the signal ENABLE is at a high level and then measures the present (or very recent) touch capacitance value and then computes the present touch capacitance change by comparing the present touch capacitance with a prior value of the touch capacitance. The program then goes to decision block 59 and determines whether a touch or other required handling of the RFID passport or document by its owner has occurred. If that determination is affirmative, the program ensures that ENABLE is at a high level which enables RFID chip 9 as indicated in block 60, and thereby temporarily allows RFID reader 3 access to data in the RFID tag 14 and possibly to other data in microcontroller 22. The RFID access control program then returns to the entry point at label 54.

If the determination of decision block 59 is negative, the program goes to decision block 62 and determines whether the passport/document has been opened, and if this determination is negative, the RFID access control program returns to the entry point at label 54. If the determination of decision block 62 is affirmative, the program returns to block 60 and sets ENABLE to a high level.

Thus, a new additional security requirement is included along with any other existing security requirements that must be met before RFID reader 3 is allowed to access data in RFID passport 5, wherein a physical touch or physical handling that generates an additional predetermined input to RFID passport 5 is required before it will enable RFID reader 3 to access anything in RFID passport 5. The described embodiment of the invention prevents access to information in the RFID passport/document 5 by not allowing it to be accessed or read from an RFID-accessible document such as a passport without the document first being suitably touched/handled (and thereby "enabled") by the person in possession of the RFID-based document.

In one embodiment, the invention provides a RFID document/passport 5 including circuitry embedded therein which must sense the opening and/or closing or other physical handling of the RFID document before allowing access to the information stored therein. When the sense capacitor 30 embedded in passport 5 is touched by the person in possession of the RFID document, its capacitance changes. The capacitance sensing circuitry in microcontroller 22 senses the capacitance change. If the sensed capacitance change meets a predetermined threshold level, microcontroller 22 generates the signal ENABLE, which allows a sufficiently powerful interrogation signal transmitted by RFID reader 3 to "wake up" RFID chip 9 and allow information stored in RFID tag 14 to be accessed by RFID reader 3. When RFID chip 9 "wakes up", it can wake up microcontroller 22 if microcontroller 22 is powered by a battery 20. If a rectifier 17 is provided, it can wake up microcontroller 22 and provide operating power to it. In one embodiment, the microcontroller 22 embedded in the passport or document 5 is powered wirelessly by the signal sent by RFID reader 3. In another embodiment, the embedded microcontroller 22 is powered by a battery 20 embedded within the passport/document 5.

In one example, when microcontroller 22 is in its active mode, it requires about 100 microamperes of operating current per megahertz (MHZ). For 10 MHZ operation, the current requirement of microcontroller 22 in its active mode is approximately 1 milliampere for approximately 10 seconds, in order to respond to an "authorized" interrogation by RFID reader 3. In its standby mode, the current requirement of microcontroller 22 is approximately 0.5 microamperes. If, for example, RFID passport 5 is opened once per day, microcontroller 22 operates in its active mode for about 10 seconds during that 24 hour interval. In that case, the cumulative current consumption/requirement of microcontroller 22 is 0.005 milliamperes+(2.5 milliamperes/0.17/24)=0.0227 milliamperes per hour. In that case, a 1000 mAH (milliampere-hours) battery can adequately power microcontroller 22 for roughly 5 years, and a 2500 mAH battery can adequately provide power to microcontroller 22 for up to roughly 12 years. (Typically, a battery (if used) only provides operating power to microcontroller 22 because RFID chip 9 typically receives all of its operating power wirelessly from RFID reader 3.)

The boot-up time for microcontroller 22 is roughly 1.5 milliseconds, and may be even less if microcontroller 22 is booted up from a low power or standby state. Thus, the entire operation of waking up microcontroller 22, reading the touch capacitance, and computing the capacitance change, and then accordingly enabling or disabling RFID chip 9 can be completed in as little as 5 milliseconds or even less.

Electronic documents and E-books are commonly loaded into an E-reader device such as a smart phone, tablet or laptop, and it may be desirable to avoid un-authorized non-physical interaction with such documents. The described access control could be utilized to help to further prevent unauthorized access to details of the documents or unauthorized loading of documents without the owner first performing a physical operation on a secure E-reader device. For example, an E-book or E-reader document may be sent from one person to another using a secure E-book or E-reader device wherein the information in the E-reader document has a predetermined lifetime that expires after a certain amount of time after which the document is automatically deleted. An unauthorized wireless transfer of such a document that could possibly occur, for example by using a Bluetooth data transfer mechanism, could be prevented by requiring a similar touching or handling of the smart phone, tablet, or laptop in order to enable a transfer of the E-book or E-reader document.

Figure 7:
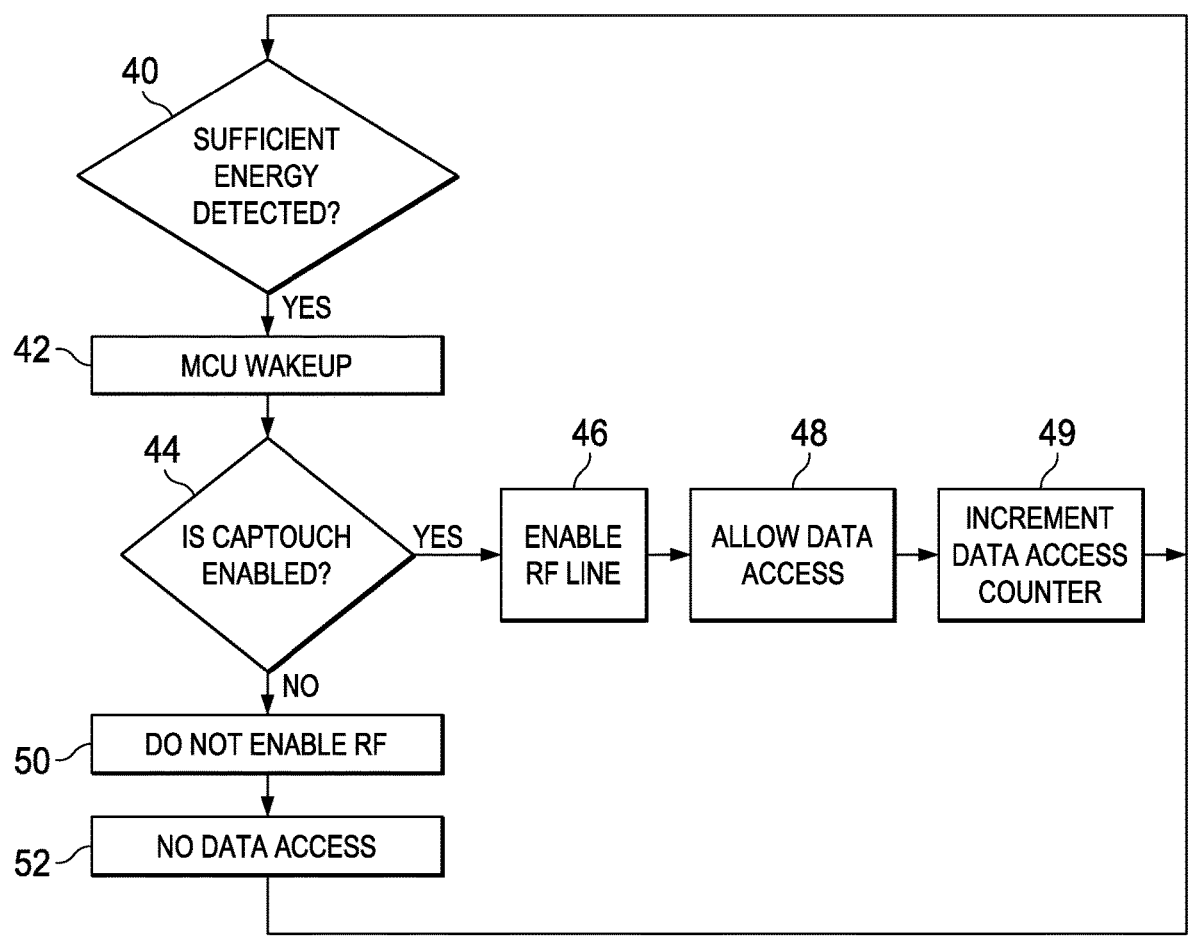
FIG. 7 is a flowchart that shows a variation of the algorithm shown in FIG. 6.

In some cases it may be advantageous to know how many times a RFID-based document or passport has been accessed or opened. For example, if a top-secret document has been opened more than twice, that could suggest a possible security breach and information leak. Microcontroller 22 can be programmed to count the number of times RFID passport 5 (or other secure document) has been accessed or opened and provide that information to a user. In the flowchart of FIG. 7 (which is the same as the flowchart of FIG. 5 except for the addition of block 49), the secure identification program/algorithm goes from block 48 to block 49 and, in accordance with block 49, increments a data access counter and then returns to block 40. The person in possession or control of the RFID passport or other secure document can readily determine the number of times it has been accessed and then act accordingly.

In some cases, the described electronic access control system may be utilized to prevent unauthorized access to a package or container which needs to be physically touched or otherwise physically handled or operated upon before RFID access to documents, passports, etc. or other wireless access utilizing a suitable digital communication framework can be achieved.

Thus, the described embodiments of the invention prevent hackers or other unauthorized persons from stealing/accessing information in a RFID-based document or other secure document by simply being sufficiently close to the document to scan it with an RFID reader or the like.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, changes in an inductance, rather than capacitance, located outside of the microcontroller chip could be measured. Furthermore, the predetermined change in value could be caused by multiple external conditions and is not limited to being caused by an act of a person.

For example, there could be a requirement that two separate fingers touch two different touch spots of the document before access to an RFID passport or confidential document would be allowed or enabled. Also, the enable signal ENABLE in FIG. 1 could actually be a "reset" signal which resets suitable circuitry in RFID chip 9 so as to prevent transceiver 10 from responding to a signal from RFID reader 3 unless microcontroller 22 determines that the person in possession of secure passport or document 5 has handled it in a required manner so as to allow it to respond to a signal from RFID reader 3. Furthermore, the secure document or passport 5 could contain or respond to a physical switch that could be manually actuated in order to allow or enable RFID chip 9 to respond to a wireless request from RFID reader 3. Also, the required act or acts by the person in possession or control of the RFID passport may require a sequence of steps to be performed by that person in order to authorize wireless access to the RFID passport.

What is claimed is:

1. A system, comprising:
    a radio frequency identification (RFID) chip, the RFID chip comprising:
        an RFID tag for storing information;
        a power input; and
        an enable input; and
    a processor coupled to the RFID chip, the processor configured to:
        operate in a first power mode in which the processor is configured to:
            monitor for energy received via an RFID signal;
            in response to the energy received via the RFID signal, transition to a second power mode in which the processor consumes more power than the first power mode; and
        operate in the second power mode in which the processor is configured to:
            in response to the transition to the second power mode, measure a capacitance at a capacitive sensor to sense a signal from a person; and
            send an enable signal to the enable input of the RFID chip in response to sensing the signal from the person.

2. The system of claim 1, wherein sensing the signal comprises sensing a human touch.

3. The system of claim 1 wherein the RFID chip comprises a transceiver.

4. The system of claim 3, wherein the transceiver of the RFID chip receives the energy received via the RFID signal.

5. The system of claim 1, wherein: the system further comprises the capacitive sensor; and
    the processor is further configured to sense the signal from the person by measuring an amount of change in the capacitance at the capacitive sensor.

6. The system of claim 1, wherein the RFID chip and the processor are embedded in a passport.

7. The system of claim 1, further comprising:
    an antenna coupled to the RFID chip, the antenna for receiving a wireless interrogation signal from an RFID reader; and
    a rectifier coupled to the antenna, the rectifier for producing the energy to cause the processor to transition to the second power mode, in response to the antenna receiving the wireless interrogation signal.

8. The system of claim 1, wherein at least part of the information is contained in a secure container, and wherein the RFID chip and the processor are in the secure container.

9. The system of claim 1, wherein the capacitive sensor includes a conductive trace embedded in a RFID passport.

10. The system of claim 1, wherein the processor is further configured to count a number of times the information has been accessed.

11. The system of claim 1, wherein the information is contained in an electronic document.

12. The system of claim 11, wherein the electronic document is stored in a wireless digital device which communicates in accordance with a predetermined communication framework.

13. A method comprising:
    storing, in a radio frequency identification (RFID) tag in an RFID chip, information, the RFID chip comprising a power input and an enable input;

detecting energy received via a radio frequency signal by a processor operating in a first power mode;

in response to the detecting of the energy, transitioning the processor from the first power mode to a second power mode;

in response to transitioning the processor from the first power mode to the second power mode, measuring a capacitance at a capacitive sensor to sense a signal from a person; and sending, by the processor to the enable input of the RFID chip, an enabling signal, in response to sensing the signal from the person.

14. The method of claim 13, wherein the sensing of the signal from the person comprises determining an amount of change in the capacitance at the capacitive sensor.

15. The method of claim 13, wherein the RFID chip and the processor are embedded in an RFID-based passport.

16. The method of claim 13, wherein the information is stored as an electronic document in a wireless digital device, wherein the wireless digital device communicates in accordance with a predetermined communication framework.

17. The system of claim 1, wherein the processor is an ultra-low-power microcontroller.

18. The system of claim 6, wherein the sensing of the signal from the person comprises detecting that the passport is open based on the capacitance at the capacitive sensor.

19. A microcontroller configured to:

in a hibernation mode, monitor for a wake up signal from a radio frequency identification (RFID) reader;

in response to the wake up signal, transition out of the hibernation mode;

in response to the transition out of the hibernation mode, measure a capacitance of a capacitive sensor; and send, to an enable input of an RFID chip, an enable sign, in response to the measure of the capacitance.

* * * * *